Feb. 5, 1946. J. H. COOMBES 2,394,151
BRAKE MECHANISM
Filed Dec. 3, 1943 2 Sheets-Sheet 1

INVENTOR
Joseph H. Coombes
BY
ATTORNEY

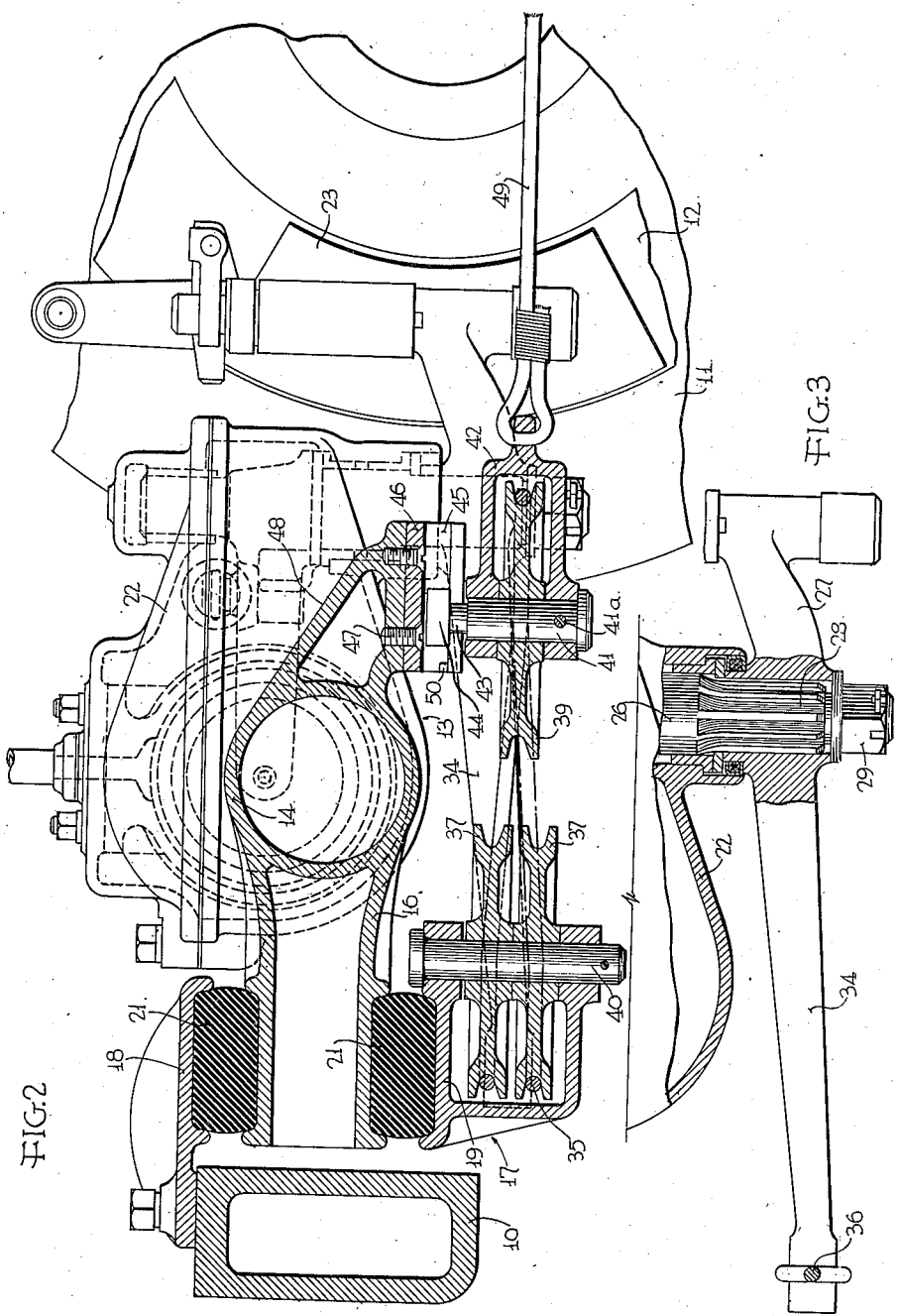

Patented Feb. 5, 1946

2,394,151

UNITED STATES PATENT OFFICE 2,394,151

BRAKE MECHANISM

Joseph H. Coombes, Detroit, Mich., assignor to Budd Wheel Company, Philadelphia, Pa., a corporation of Pennsylvania Application December 3, 1943, Serial No. 512,729

4 Claims. (Cl. 188—107)

The invention relates to brake mechanism and more particularly to such mechanisms adapted for association with railway trucks or like vehicles.

The invention is particularly concerned with the simplification of the actuating means for such brake mechanisms and the provision of both manual and fluid pressure actuation, designed to act, either independently of, or in conjunction with each other.

A further feature of the invention is the provision of manually actuated means which make use of parts of the fluid-pressure actuated means and employ novel equalizing means.

A further feature is the provision of manually-actuated means which simplify the application of equalized braking forces to opposed wheels and in which the reaction of the manually-actuated means is taken by the truck frame or other vehicle frame.

Other and further objects and advantages and the manner in which they are attained will become clear from the following detailed description when read in connection with the drawings forming a part hereof.

In the drawings:

Fig. 2 is a longitudinal vertical sectional view taken substantially along the line 2—2 of Fig. 1, and Fig. 3 is fragmentary detail view partly in vertical section and partly in side elevation, the section being taken through the vertical pivot axis of a brake lever.

Figure 1:
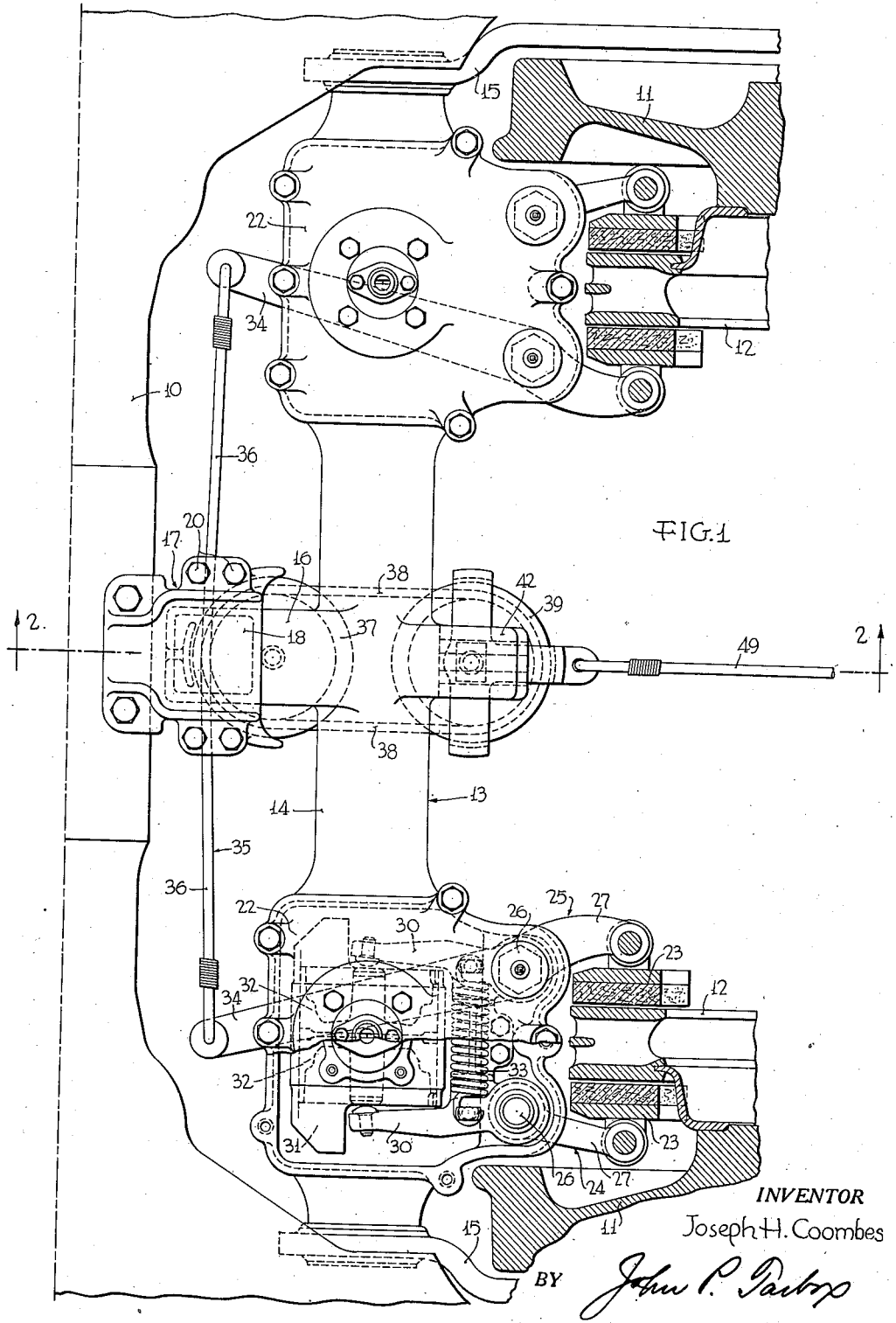
Fig. 1 is a fragmentary plan view of a portion of a truck showing the invention applied thereto, parts being broken away and parts shown in horizontal sectional view taken substantially in the plane of the axles of the truck.

The brake mechanism and mounting therefor shown corresponds generally to the arrangement shown in co-pending application Serial No. 399,779 for Brake mechanism, filed June 26, 1941.

In the form shown, the invention is applied to a railway truck having a usual frame including side members (not shown) interconnected by transverse members, as 10, the frame being supported through the side members on the ends of a wheel and axle assembly, the opposite wheels of which are designated 11. Each wheel of the wheel and axle assembly is provided with a rotary brake element or ring, as 12, which is secured thereto to rotate therewith.

The brake support designated generally by the reference numeral 13, may comprise a U- or C-frame generally similar in form to that shown in the co-pending application hereinbefore referred to, this U- or C-frame having a transversely extending beam portion 14 supported at three points on the associated railway truck.

This three point support is attained by having the intermediate portion of the beam 14 supported from the truck frame and the opposite lateral ends by longitudinally extending arms 15 supported from the ends of the wheel and axle assembly, all in a manner generally similar to that shown in the co-pending application referred to, except for the modified beam support from the truck frame now to be described.

The beam 14 is, in this instance, shown supported centrally thereof by a lateral extension 16 having its end received in a surrounding bracket 17 bolted to the transverse member 10. This bracket may comprise upper and lower parts 18 and 19 bolted together in their lateral flanged margins, as indicated, at 20, Fig. 1.

When the bracket parts are so secured together, they clamp the end of the extension 16, between upper and lower rubber blocks 21. Obviously the form of the support could be varied from that shown, since the present invention is not directed to this feature.

The beam support 14 has its lateral portions, as 22, enlarged, in the region of the laterally spaced brake rings 12 to provide closed casings mounting the actuating levers cooperating with the non-rotary brake elements or shoes 23 associated with the respective rotary brake rings 12.

The construction of these enlarged casings 22 and the mounting of the brake levers therein is generally similar to the arrangement disclosed and claimed in co-pending application Serial No. 512,728, filed December 3, 1943.

Suffice it to say that each closed casing 22 has two brake levers mounted therein at laterally spaced points, the outboard of these levers, that is the one toward the outside of the truck, being designated 24 and the inboard lever, 25. Each of the levers is mounted in the casing through a pivot portion 26 and each has an outside arm as 27 connected to the pivot portion by a splined connection 28 and secured in place by a nut 29, see Fig. 3. Each lever has an arm 30 extending from its pivot portion 26 into the casing and into cooperative relation with a fluid pressure actuator, such as the cylinder 31 and pistons 32, one for cooperation with each arm. The outer arms 27 of the levers pivotally carry the brake shoes 23, respectively, arranged on the opposite sides of the rotary brake ring 12. The manner in which the shoes are carried by the levers is similar to that shown in co-pending application Serial No. 529,730, filed April 6, 1944, and need not be further described herein.

To apply the brakes by the fluid pressure actuating means, fluid under pressure is admitted between the pistons of the cylinders 31 forcing the pistons 32 outwardly and thereby moving the levers 24 and 25 and the shoes carried thereby into braking engagement with the rotary brake ring 12. A tension spring 33 interconnecting the lever arms 30 returns the parts to inoperative position, when the fluid pressure is released.

The construction and operation of the brake mechanism so far described is substantially the same as that shown and described in the above-referred to co-pending application, Serial No. 512,728.

In addition to the fluid pressure actuation, the present invention provides for manual actuation of the brakes, either in conjunction with, or independently of the fluid pressure actuation. To this end the outer arms 27 of the inboard levers 25 arranged at the opposite ends of the support beam 14 are made heavier and stronger than the corresponding arms of the outboard levers 24 and have extension arms 34 extending from the pivot portions thereof in a direction oppositely from the arms 27.

In the embodiment shown these arms 34 extend substantially to the transverse member 10 of the truck frame. The ends of these arms are interconnected for manual actuation through a novel equalizing means now to be described.

The ends of a flexible element or cable 35 are connected to the ends of the respective lever arms 34, each end of the cable passing by a straight reach 36 extending transversely inwardly toward the center line of the truck around one of a pair of independently rotatable sheaves 37, and from these sheaves the cable forms a loop having parallel longitudinal reaches 38 and passing around a third sheave 39. The pair of sheaves 37 are carried by the truck frame, and, in the instant case, they are shown mounted in the lower part 19 of the bracket 17 for rotation on the common pin 40 extend through spaced ears in the part 19 and the hubs of the sheaves disposed therebetween.

The third sheave 39 is mounted for longitudinal floating movement in any suitable support. In the present instance, it is shown rotatably mounted on a pin 41 passing through the spaced arms of a clevis 42 and the hub of the sheave disposed therebetween and locked in place, as by a cotter pin 41a. The pin has a reduced portion 43 extending above the clevis terminating in an enlarged head 44. This enlarged head and portion 43 may be slidingly received in a longitudinally extending T-slot 45 formed in a part 46, removably secured, as by screws 47 to the longitudinally extending face of an integral projection 48 on the beam support 14.

An actuating cable 49 is secured to an eye in the clevis 42 and extends longitudinally to a suitable manual actuating means on the vehicle. The T-slot may be provided with a stop, 50 preventing undue slack in the cable 36.

From the foregoing it will be seen that a longitudinal pull on the cable 49 will move the floating sheave longitudinally in its support to place the cable 36, interconnecting the ends of the lever arms 34 together, in tension, thus pulling the lever arms toward each other and applying the inboard brake shoes to the rotary brake rings with an equalized braking pressure. Upon release of the actuating cable 49, the springs 33 will return the parts to inoperative position.

With this arrangement a very simple combined manual and fluid pressure actuation of the brakes is made possible in which the manual actuation is connected to but one of the pairs of shoes cooperating with the respective brake rings and in which the manual actuating force is directly reacted by the truck frame without exerting any bending moment on the transverse beam support. Equalizing of brake pressures is obtained both for the manual and the fluid pressure operation, and the manual and fluid pressure actuating means may be operated jointly to produce more pronounced braking action, or either can be operated independently of the other.

While a specific embodiment of the invention has been herein described in detail, it will be understood that changes and modifications may be made by those skilled in the art without departing from the main features of the invention, and such changes and modifications are intended to be covered in the appended claims.

What is claimed is:

1. In a brake mechanism for a vehicle having a wheel and axle assembly and a vehicle frame supported thereby, a rotary brake element rotating with each wheel of said assembly, a non-rotary brake element operatively associated with each rotary brake element, a transversely extending brake support, an actuating lever operatively associated with each non-rotary element and pivoted on said support, and means for actuating said levers to apply equalized braking force thereto comprising a flexible element having one end thereof connected to one lever, thence passing transversely of the vehicle and around a sheave supported from the vehicle frame, thence around a sheave mounted for longitudinal floating movement and finally around another sheave supported from the frame and transversely of the vehicle to a corresponding connection to the other lever, whereby a pull in longitudinal direction exerted on the floatingly mounted sheave applies the brakes associated with the respective wheels with equal force without placing any appreciable bending moment upon the transverse brake support.

2. In a brake mechanism for a vehicle having a wheel and axle assembly, and a frame supported thereby, a rotary brake element rotating with each wheel of said assembly, a non-rotary brake element operatively associated with each rotary brake element, a transversely extending brake support, an actuating lever associated with each non-rotary brake element and pivoted on the support, a fluid pressure actuator operatively connected with each lever and manually-operated means interconnecting said levers for manual operation thereof independently of, or in conjunction with, said fluid pressure actuators, said means comprising a flexible member connected to one lever, thence extending transversely of the vehicle and around a sheave supported from the frame, thence around an equalizing sheave mounted for movement in longitudinal direction, thence around another sheave supported from the frame and transversely of the vehicle to a corresponding connection to the other lever, whereby a pull on the equalizing sheave in longitudinally direction applies equalized forces to the non-rotary brake elements cooperating with the respective rotary brake elements without placing any appreciable bending moment upon the transverse brake support.

3. In a brake mechanism for a truck having a wheel and axle assembly and a frame supported thereby having a transverse member spaced longitudinally from said assembly, similar rotary brake elements, one rotating with each wheel of said assembly, similar non-rotary brake elements, one operatively associated with each of said rotary brake elements, a brake support having a portion extending transversely between the peripheral portions of said rotary brake elements and said transverse member of the frame, similar brake levers pivoted intermediate their ends on said transversely extending portion of the brake support, one adjacent each rotary brake element, said levers having one of their arms operatively associated with one of the respective non-rotary brake elements and the other of their arms extending toward the transverse member of the frame, and means for operating the brakes comprising a cable connected at its ends to the last-named arms of the respective levers and passing from thence, respectively, over a pair of sheaves supported between the levers on the transverse member of the frame, and thence looped around a floatingly mounted sheave, whereby a pull on the floating mounting of said sheave longitudinally of the truck transmits through the flexible member an equalized braking pressure to the brakes associated with the respective wheels.

4. In a brake mechanism, a wheel and axle assembly carrying adjacent its opposite ends, wheels each provided with a rotary braking face, a transversely extending brake support having spaced enlarged casing portions, one opposite each of said braking faces associated with the respective wheels, each of said casing portions carrying therein a fluid pressure actuator and mounting a brake lever having a portion pivoted in said casing, an outside arm extending from said pivotal portion and carrying a non-rotary brake member in cooperative relation to the adjacent braking face, an inside arm extending into the casing into cooperative relation to the fluid pressure actuator, and a second outside arm extending in a direction from said pivotal portion opposite the arm carrying the non-rotary brake member, said last-named arms of the levers associated with the respective casing portions being connected to equalizing means for manually actuating the levers and applying the brakes, either in conjunction with, or independently of, the fluid pressure actuator.

JOSEPH H. COOMBES.